(12) United States Patent
Ide

(10) Patent No.: US 7,306,059 B2
(45) Date of Patent: Dec. 11, 2007

(54) THRUST BEARING ASSEMBLY

(76) Inventor: Russell Douglas Ide, P.O. Box 878, Charlestown, RI (US) 02813

( * ) Notice: Subject to any disclaimer, the term of this patent is extended or adjusted under 35 U.S.C. 154(b) by 359 days.

(21) Appl. No.: 11/148,178

(22) Filed: Jun. 9, 2005

(65) Prior Publication Data

US 2006/0278439 A1     Dec. 14, 2006

(51) Int. Cl.
*E21B 4/00* (2006.01)
*F16C 17/00* (2006.01)

(52) U.S. Cl. .................................... 175/107; 384/129

(58) Field of Classification Search ................... None
See application file for complete search history.

(56) References Cited

U.S. PATENT DOCUMENTS

| | | | |
|---|---|---|---|
| 3,893,737 A * | 7/1975 | Tyson | 384/307 |
| 4,496,251 A | 1/1985 | Ide | |
| 4,515,486 A | 5/1985 | Ide | |
| 4,526,482 A | 7/1985 | Ide | |
| 4,560,014 A | 12/1985 | Geczy | |
| 4,676,668 A | 6/1987 | Ide | |
| 4,738,453 A | 4/1988 | Ide | |
| 4,877,257 A | 10/1989 | Ide | |
| 5,007,490 A | 4/1991 | Ide | |
| 5,007,491 A | 4/1991 | Ide | |
| 5,013,947 A | 5/1991 | Ide | |
| 5,033,871 A | 7/1991 | Ide | |
| 5,048,622 A | 9/1991 | Ide | |
| 5,048,981 A | 9/1991 | Ide | |
| 5,054,938 A | 10/1991 | Ide | |
| 5,066,144 A | 11/1991 | Ide | |
| 5,074,681 A | 12/1991 | Turner et al. | |
| 5,096,004 A | 3/1992 | Ide | |
| 5,102,236 A | 4/1992 | Ide | |
| 5,102,237 A | 4/1992 | Ide | |
| 5,112,143 A | 5/1992 | Ide | |
| 5,125,754 A | 6/1992 | Ide | |
| 5,135,060 A | 8/1992 | Ide | |
| 5,136,739 A | 8/1992 | Ide | |
| 5,137,373 A | 8/1992 | Ide | |
| 5,139,400 A | 8/1992 | Ide | |
| 5,142,174 A | 8/1992 | Ide | |
| 5,156,443 A | 10/1992 | Ide | |
| 5,165,140 A | 11/1992 | Ide | |
| 5,203,438 A | 4/1993 | Ide | |
| 5,203,808 A | 4/1993 | Ide | |
| 5,213,421 A | 5/1993 | Ide | |
| 5,213,545 A | 5/1993 | Ide | |
| 5,215,385 A | 6/1993 | Ide | |
| 5,222,815 A | 6/1993 | Ide | |
| 5,246,295 A | 9/1993 | Ide | |
| 5,248,204 A | 9/1993 | Livingston et al. | |
| 5,254,893 A | 10/1993 | Ide | |

(Continued)

*Primary Examiner*—Frank Tsay
(74) *Attorney, Agent, or Firm*—Michael Bednarek; Paul, Hastings, Janofsky & Walker LLP

(57) ABSTRACT

A thrust bearing assembly in which each thrust pad is individually mounted on a deflection element. An embodiment of the invention comprises a rotating bearing runner having a wear resistant face and a stationary bearing carrier defining a plurality of cavities disposed annularly around the carrier. A deflection element, such as a Belleville washer, is disposed in a cavity of the plurality of cavities and a pad is disposed over the deflection element. The pad is at least partially disposed within the cavity. The wear resistant face of the rotating bearing runner contacts the pad.

23 Claims, 5 Drawing Sheets

U.S. PATENT DOCUMENTS

| | | |
|---|---|---|
| 5,255,984 A | 10/1993 | Ide |
| 5,275,493 A | 1/1994 | Ide |
| 5,281,033 A | 1/1994 | Ide |
| 5,284,392 A | 2/1994 | Ide |
| 5,304,006 A | 4/1994 | Ide |
| 5,321,328 A | 6/1994 | Ide |
| 5,372,431 A | 12/1994 | Ide |
| 5,377,802 A | 1/1995 | Ide |
| 5,382,097 A | 1/1995 | Ide |
| 5,385,409 A | 1/1995 | Ide |
| 5,393,145 A | 2/1995 | Ide |
| 5,403,154 A | 4/1995 | Ide |
| 5,417,612 A | 5/1995 | Ide |
| 5,421,655 A | 6/1995 | Ide et al. |
| 5,425,584 A | 6/1995 | Ide |
| 5,441,347 A | 8/1995 | Ide |
| 5,447,472 A | 9/1995 | Ide |
| 5,455,778 A | 10/1995 | Ide et al. |
| 5,459,674 A | 10/1995 | Ide et al. |
| 5,489,155 A | 2/1996 | Ide |
| 5,499,705 A | 3/1996 | Ide |
| 5,503,479 A | 4/1996 | Ide |
| 5,513,917 A | 5/1996 | Ide et al. |
| 5,515,458 A | 5/1996 | Ide |
| 5,531,522 A | 7/1996 | Ide et al. |
| 5,556,208 A | 9/1996 | Ide |
| 5,558,444 A | 9/1996 | Ide |
| 5,559,383 A | 9/1996 | Ide |
| 5,564,836 A | 10/1996 | Ide et al. |
| 5,603,574 A | 2/1997 | Ide et al. |
| 5,620,260 A | 4/1997 | Ide |
| 5,660,481 A | 8/1997 | Ide |
| 5,743,654 A | 4/1998 | Ide et al. |
| 5,833,541 A | 11/1998 | Turner et al. |
| 6,190,050 B1 * | 2/2001 | Campbell .................. 384/129 |
| 2004/0241021 A1 | 12/2004 | Ide et al. |

* cited by examiner

DETAIL A

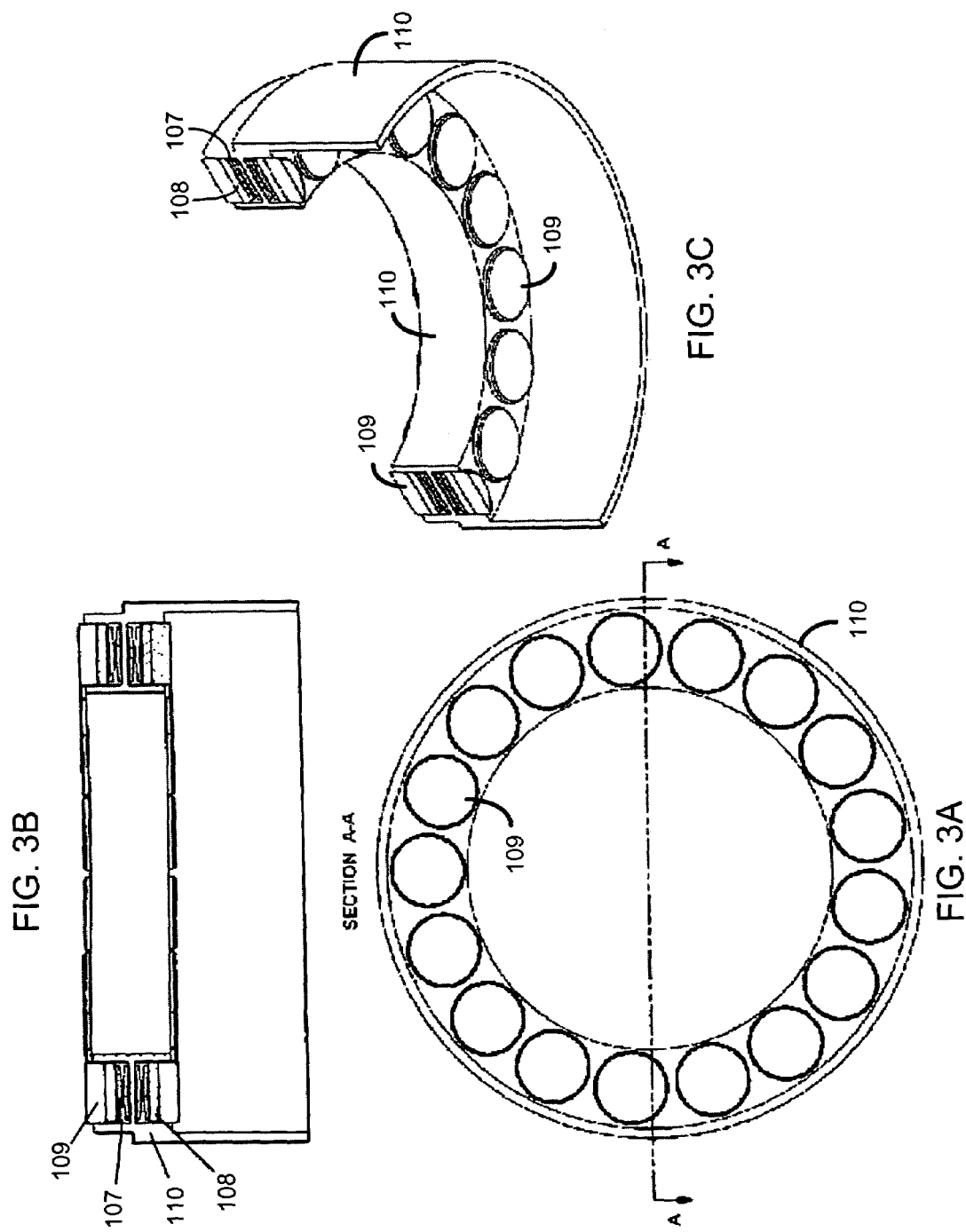

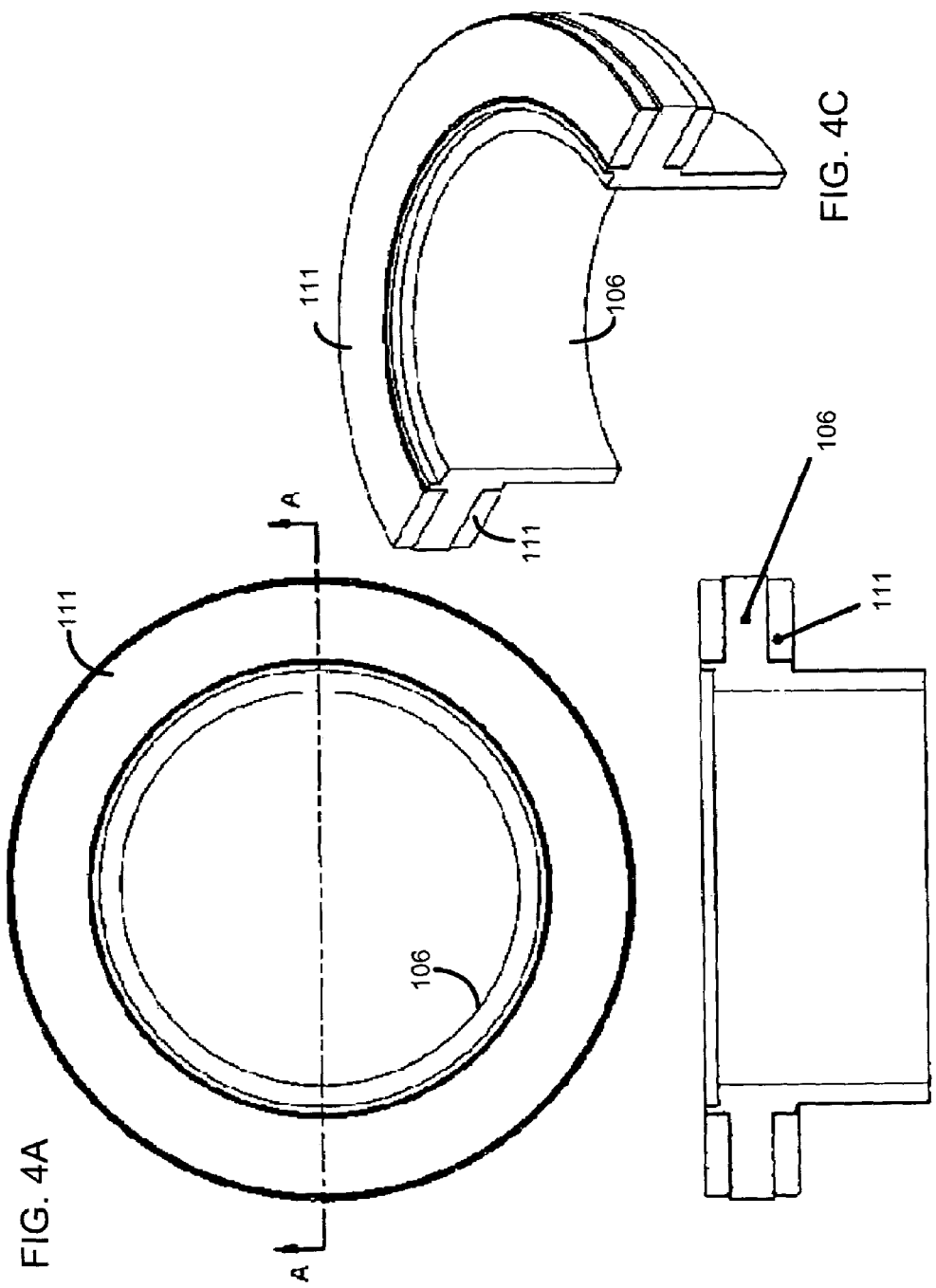

US 7,306,059 B2

THRUST BEARING ASSEMBLY

BACKGROUND

1. Field of the Invention

The present invention relates to thrust bearing assemblies, and more particularly to a hydrodynamic thrust bearing assembly having thrust pads individually mounted on resilient deflection elements, such as Belleville washers.

2. Background of the Invention

Most conventional downhole drilling motors use rolling element-type bearings, such as ball rollers or angular contact rollers. U.S. Pat. No. 5,074,681 to Turner et al. discloses an example of ball rollers. U.S. Pat. No. 5,248,204 to Livingston et al. discloses an example of angular contact rollers. Typically, these rolling element-type bearings are lubricated by the drilling fluid (mud) or by clean oil when encased in a sealed oil chamber. Due to the high loads, pressure, and abrasive conditions, bearing life is typically only several hundred hours.

Motors typically have a multiple number of bearings. The bearings can be resiliently supported on Belleville washers to equalize loading among bearings and to absorb shock. Rolling element-type bearings are not tolerant of abrasives and thus wear quickly when exposed to mud lubrication. Once wear occurs, loads between the individual balls become uneven and wear rates accelerate. Indeed, rolling element balls taken from failed units are sometimes half their original diameter. For the oil-lubricated bearings, once the seals fail, wear occurs in a similar way.

Another type of bearing used in downhole drilling motors is a hydrodynamic or sliding surface type. U.S. Pat. No. 4,560,014 to Geczy discloses an example of this hydrodynamic bearing type, which uses rigidly mounted pads manufactured of industrial diamond. The diamond pads are mud-lubricated and slide against each other. These bearings, however, are extremely expensive and only marginally increase service life.

Other examples of hydrodynamic bearings are disclosed in the inventor's previous U.S. Pat. No. 5,441,347 to Ide and U.S. Pat. No. 5,620,260 also to Ide, both of which are incorporated herein by reference. These pad type hydrodynamic thrust bearings include a carrier and a plurality of bearing pads circumferentially spaced about the carrier. The pads may be provided with individual support structures and supported in the carrier, or may be integrally formed with the carrier.

SUMMARY OF THE INVENTION

An embodiment of the present invention provides a hydrodynamic thrust bearing assembly in which each thrust pad is individually mounted on a deflection element. Rather than mounting an entire bearing having fixed pads on a resilient member (e.g., spring), the present invention resiliently mounts the individual thrust pads, thereby avoiding costly finish-grinding/lapping of the complete bearing assembly.

An exemplary thrust bearing assembly according to an embodiment of the present invention comprises a rotating bearing runner having a wear resistant face and a stationary bearing carrier defining a plurality of cavities disposed annularly around the carrier. A deflection element is disposed in a cavity of the plurality of cavities and a pad is disposed over the deflection element. The pad is at least partially disposed within the cavity. The wear resistant face of the rotating bearing runner contacts the pad.

Another embodiment of the present invention provides a thrust bearing assembly for a downhole motor comprising a first stationary bearing carrier defining a first plurality of cavities disposed annularly around the first stationary bearing carrier, a second stationary bearing carrier defining a second plurality of cavities disposed annularly around the second stationary bearing carrier, and a rotating bearing runner disposed between the first stationary bearing carrier and the second stationary bearing carrier. The rotating bearing carrier has a first wear resistant face and a second wear resistant face. Each cavity of the first plurality of cavities and the second plurality of cavities holds a deflection element and a pad disposed over the deflection element. The first wear resistant face is in contact with the pads of the first stationary bearing carrier. The second wear resistant face is in contact with the pads of the second stationary bearing carrier.

Another embodiment of the present invention provides a downhole drilling apparatus that includes a progressive cavity drive train. The apparatus comprises a housing structure, a stator, a rotor, and a thrust bearing assembly. The stator has a longitudinal axis. The rotor has a true center and is located within the stator. The stator and the rotor each have coacting helical lobes that are in contact with one another at any transverse section. The stator has one more helical lobe than the rotor such that a plurality of progressive cavities is defined between the rotor and the stator. The rotor is adapted to rotate within the stator such that the true center of the rotor orbits the axis of the stator. The orbit has a predetermined radius and the orbiting motion of the rotor causes a progression of the progressive cavities in the direction of the axis of the stator. The thrust bearing assembly is coupled to the rotor and comprises a rotating bearing runner having a wear resistant face and a stationary bearing carrier defining a plurality of cavities disposed annularly around the carrier. A deflection element is disposed in a cavity of the plurality of cavities and a pad is disposed over the deflection element. The pad is at least partially disposed within the cavity. The wear resistant face of the rotating bearing runner contacts the pad.

BRIEF DESCRIPTION OF THE DRAWINGS

FIG. 3A is a plan view of an exemplary bearing carrier, according to an embodiment of the present invention.

FIG. 3B is a sectional view of the bearing carrier of FIG. 3A along line A-A.

FIG. 3C is an isometric view of a section of the bearing carrier of FIG. 3A along line A-A.

FIG. 4A is a plan view of an exemplary runner, according to an embodiment of the present invention.

FIG. 4B is a sectional view of the runner of FIG. 4A along line A-A.

FIG. 4C an isometric view of a section of the runner of FIG. 4A along line A-A.

DETAILED DESCRIPTION OF THE INVENTION

Figure 1:
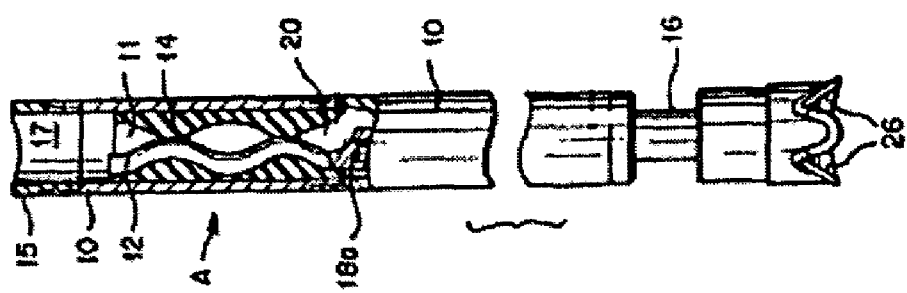
FIG. 1 is an elevation view partly in section of the overall structure of a downhole drilling apparatus according to an embodiment of the present invention.

Embodiments of thrust bearing assemblies are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

An embodiment of the present invention provides a novel, longer life, higher capacity, lower cost hydrodynamic bearing that operates in, for example, a mud-lubricated or sealed oil bath-lubricated drilling motor bearing system. The pad wear surface can be made of a material that is harder than the particles typically found in the mud and that does not wear when maximum loads are kept in approximately the 1000 to 2000 psi range. Examples of suitable pad wear material include silicon carbide and tungsten carbide. Load equalization among individual pads within each bearing can be accomplished by resiliently mounting each thrust pad on deflection elements, such as Belleville washers. This resilient mounting differs from mounting the entire bearing, encompassing fixed pads, on a resilient element (spring), as has been done in the prior art. Indeed, resiliently mounting individual pads eliminates costly finish-grinding/lapping of the complete bearing assembly.

When designed to fit into existing motor bearing envelopes, thrust loading of approximately 1000 psi or less can be achieved. Tests conducted in mud lubrication at these loads have shown virtually no wear. In a preferred embodiment, the present invention includes a number of rotating disc members of abrasion-resistant hard wear surfaces and a number of stationary pad-type bearing members opposite one or both sides of the rotating member. The bearing members comprise pad carriers with a plurality of cavities for fitting hard ceramic wear pads on resilient elements, such as Belleville washers.

In an embodiment of a method for manufacturing a thrust bearing according to the present invention, the components are first loosely assembled. The stationary bearing carriers are then bolted or welded together after assembly with a preload (e.g., a slight compression) on the springs. This construction ensures that all components are held in position for proper alignment. Because of the difficulty in predicting precise loads downhole, the present invention can be designed with an overload protection blank runner that engages prior to bottoming of the Belleville washers. For example, a blank runner can be coupled to a bearing carrier of the thrust bearing assembly and configured to engage a blank overload stop. As used herein, the term "coupled" encompasses a direct connection, an indirect connection, or a combination thereof.

Illustrating one particular application of the present invention, FIG. 1 shows the overall structure of a progressive cavity drilling apparatus in which a hydrodynamic pad type thrust bearing of the present invention can be used. As shown, the apparatus includes a drill string 15, a progressive cavity drive train, a drill bit drive shaft 16, and a drill bit 26. The drive train includes a progressive cavity device and a coupling for converting the motion of the rotor of the progressive cavity device, e.g., orbiting of the rotor and the rotational motion of the rotor, into rotation about a single axis at the same speed. This coupling, which is contained in the lower part of housing 10 and is not visible in FIG. 1, is a joint assembly including one or more thrust bearing members of the present invention. The joint assembly can be, for example, either a mud-lubricated or sealed oil bath-lubricated drilling motor bearing system.

As illustrated in FIG. 1, the progressive cavity device A has a stator, a rotor, a passageway 11 for fluid to enter between the stator and the rotor, and a passageway 20 for the fluid to exit therefrom. In the drawings, the housing 10 and its flexible lining 14 are held against movement so that they function as the stator in the device A and the shaft 12 functions as the rotor. The housing 10 is tubular and its interior communicates with inlet 11 in the top portion of the lining 14 to provide a passageway for fluid to enter the progressive cavity device A. Outlet 20 in the bottom portion of the lining 19 serves as the passageway for fluid to discharge from the progressive cavity device A. The shaft 12 is precisely controlled so as to roll within the lining 14. The progressive cavity device A is attached to the lower end of a drill string 15.

The lower end of the rotor shaft 12 includes a shaft connection 18a. The shaft connection allows the rotor 12 to be directed to a stub shaft of the coupling. One end of the coupling is directly connected, by threading, splining, or the like, to the rotor shaft 12. The other end of the coupling is similarly connected to a drill bit drive shaft 16. Typically, the coupling includes separate stub shafts that are connected to the rotor shaft 12 and drive shaft 16 by connecting means such as threads, splines, and the like. Of course, a stub shaft could be integrally formed (connected) to either of these shafts, if desired. The drill bit drive shaft 16 is rotatably connected to a conventional drill bit 26.

The progressive cavity train functions as a fluid motor or driving apparatus for driving the drilling apparatus shown in FIG. 1. Thus, a pressurized fluid, typically water carrying suspended particles commonly referred to as "mud," is forced into the progressive cavity device. The rotor 12 responds to the flowing fluid to produce a rotor driving motion that is simultaneously a rotation, an oscillation, and an orbit. The coupling attached to the rotor 12 at connection point 18a and aligned with the true center 28 of the rotor described above converts this rotor driving motion into rotational driving motion substantially about a single axis.

Figure 2A:
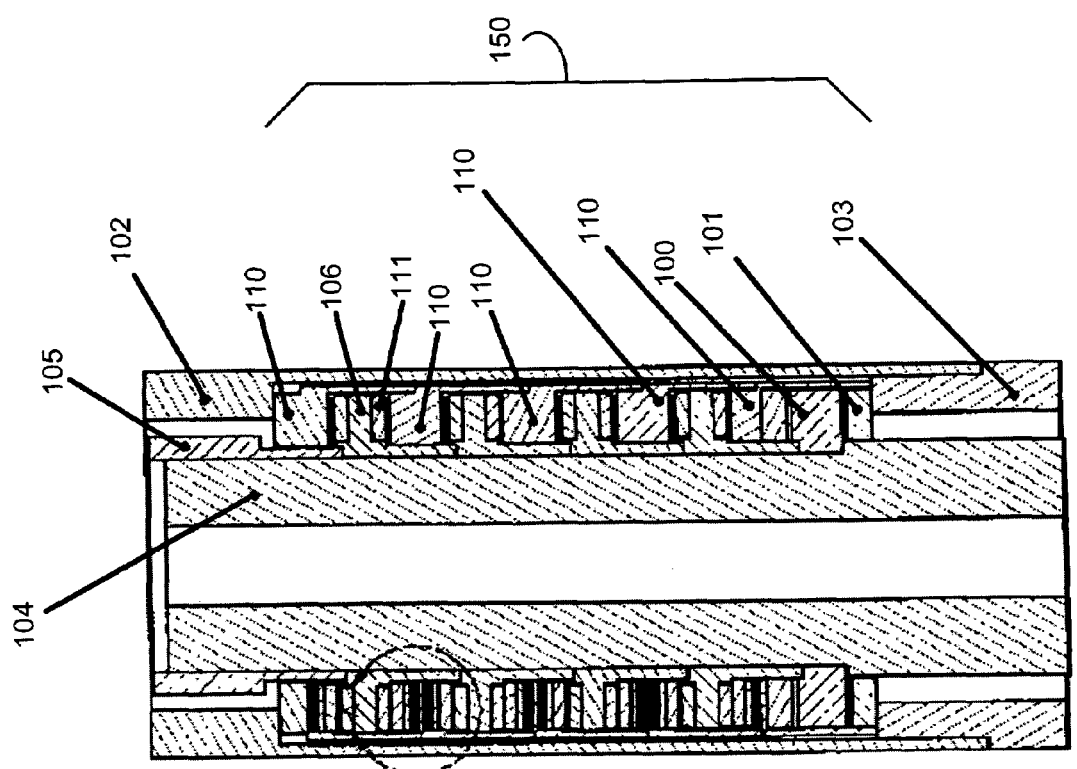
FIG. 2A is a sectional view of an exemplary thrust bearing assembly installed in a downhole motor, according to an embodiment of the present invention.
Figure 2B:
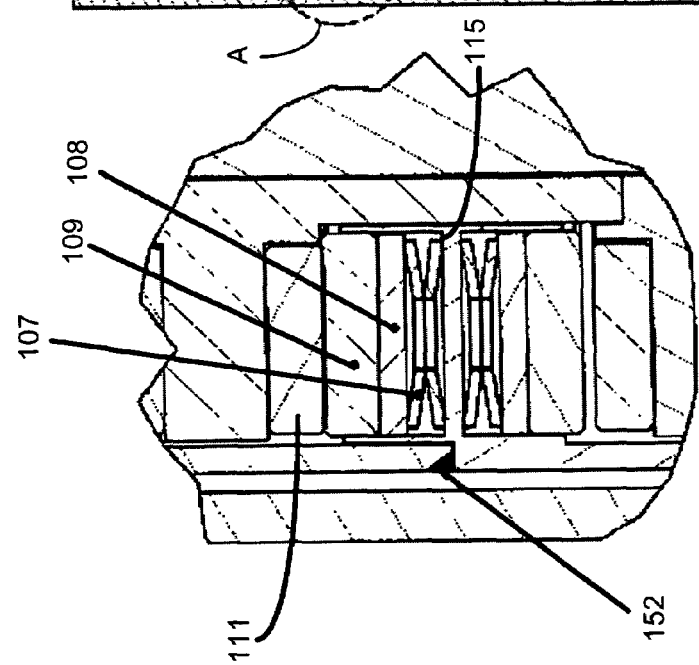
FIG. 2B is an enlarged view of a portion of the thrust bearing assembly of FIG. 2A.

FIGS. 2A and 2B show sectional views of an exemplary thrust bearing assembly 150 installed in a downhole motor, according to an embodiment of the present invention. As shown, a drill motor shaft 104 is coupled to a drill bit (not shown) located below the thrust bearing assembly 150. Drill motor shaft 104 is housed in drill casings 102 and 103. Stationary bearing members 110 and 101 are fixed between the drill casings 102 and 103. Stationary bearing members 110 are bearing carriers. Stationary bearing member 101 is a blank overload stop. Bearing carriers 110 and blank overload stop 101 are fixed in the drill string assembly via compressive forces on the top and bottom applied by drill casings 102 and 103.

Rotating bearing runners 106 are locked to the rotating shaft 104 with compressive forces on the top and bottom by the threaded drill casing member 105. Wear resistant inserts 111 (e.g., made of silicon carbide and tungsten carbide) are fitted to rotating bearing runners 106 with adhesive. Optionally, wear resistant inserts 111 can be omitted if rotating bearing runners 106 have integral wear resistant faces. For example, bearing runners 106 can be entirely made from a wear resistant material, such as silicon carbide and tungsten carbide.

Each stationary bearing carrier 110 includes one or more thrust pads. Each thrust pad can be resiliently mounted within an individual cavity. In one embodiment shown in FIG. 3A and discussed below, the individual thrust pads are disposed annularly around a carrier. As shown in the cross-sectional view of FIG. 2B, a pad 109 can be resiliently mounted on a deflection element 107 within a counterbore 115 of bearing carrier 110. In this case, pad 109 is a hard ceramic disc and deflection element 107 is a resilient washer, such as a Belleville washer. A steel disc 108 can optionally be provided between the pad 109 and deflection element 107 to uniformly distribute the deflection element loads to the bottom of the pad 109 to eliminate any stress risers.

As shown in FIG. 2A, to provide overload protection, an exemplary thrust bearing assembly of the present invention can include a blank steel runner 100 that engages the blank overload stop 101 just prior to bottoming of the deflection elements 107.

Figure 2C:
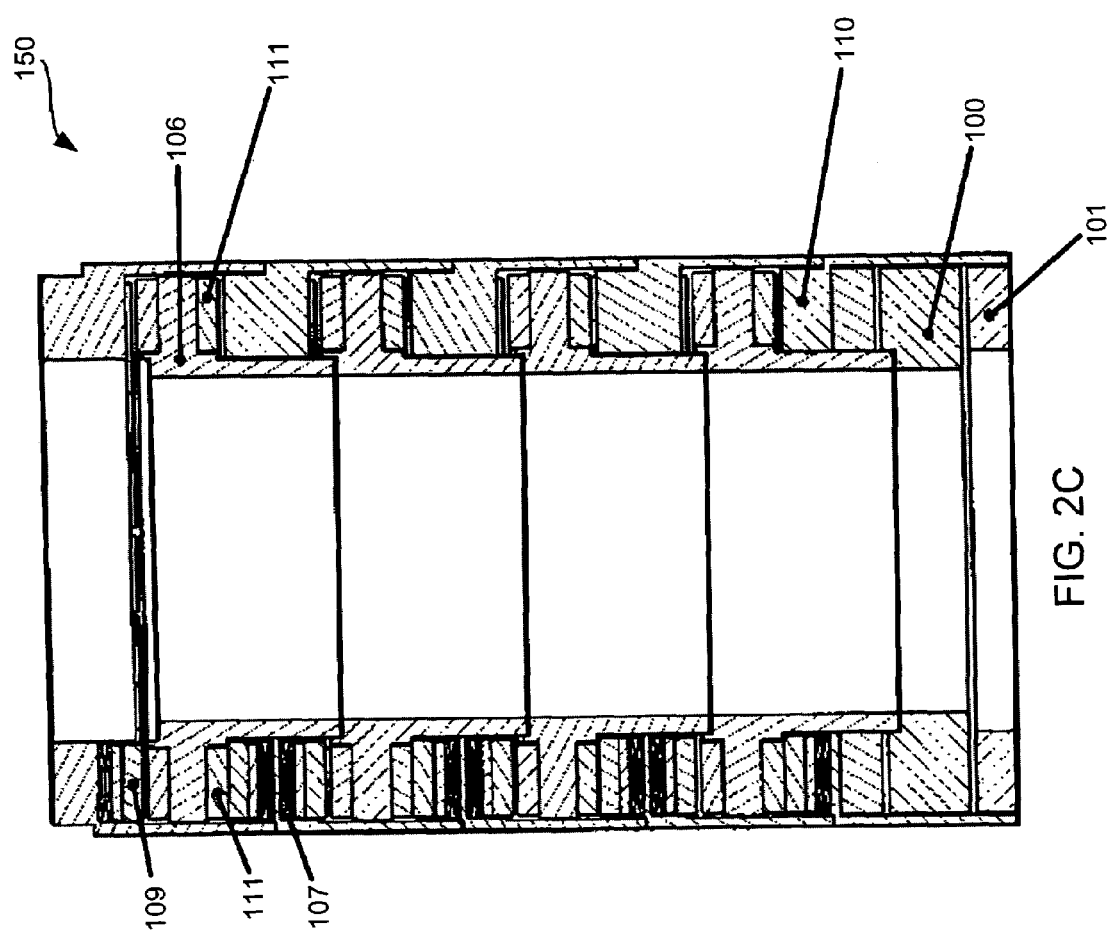
FIG. 2C is a sectional view of the thrust bearing assembly of FIG. 2A prior to welding.

As shown in FIG. 2B, welds 152 at the base of each bearing carrier 110 lock the entire assembly together and hold the individual components in position. FIG. 2C illustrates a sectional view of bearing assembly 150 prior to this welding, showing blank overload stop 101, blank steel runner 100, stationary bearing carrier 110, rotating bearing runners 106, and a pad 109 (e.g., a ceramic wear disc) assembled together.

FIGS. 3A-3C illustrate an exemplary bearing carrier 110 for use in a thrust bearing assembly of an embodiment of the present invention. As shown in FIGS. 3A and 3C, bearing carrier 110 includes a bearing carrier housing having two groups of cavities annularly disposed around the carrier. The first group faces in one direction generally along the axis of the carrier 110, and the second group faces in generally the opposite direction along the axis. A deflection element 107 is disposed in each cavity. A pad 109 (e.g., a wear resistant insert) is disposed over each deflection element 107. Optionally, a load distribution washer 108 is disposed between the deflection element 107 and the pad 109. Deflection element 107 is a resilient washer, such as a Belleville washer. Load distribution washer 108 is a steel disc, for example. Pad 109 is, for example, an abrasion resistant circular pad as shown. In one embodiment, deflection element 107, load distribution washer 108, and pad 109 are loosely assembled within cavity 115, are held in place by the confines of cavity 115 and by bearing runner 106 (specifically, insert 111, if provided), and are not attached to each other.

In an aspect of the present invention, as shown in FIGS. 2B, 3B, and 3C, pad 109 is at least partially disposed within cavity 115. In this manner, pad 109 is constrained radially within cavity 115, but is still free to move axially as deflection element 107 compresses and expands. Thus, each pad 109 can float axially within its cavity 115 as bearing runner 106 rotates and contacts pads 109. Such independent axial movement provides load equalization among the individual pads within the bearing carrier 110.

FIGS. 4A-4C illustrate an exemplary bearing runner 106 for use in a thrust bearing assembly of an embodiment of the present invention. Bearing runner 106 rotates with the drill motor shaft. As shown best in FIG. 4B, bearing runner 106 includes a bearing runner housing with wear resistant, or abrasion resistant, rings 111 that are fitted to the runner, for example, by adhesive. Optionally, rings 111 can be omitted if bearing runner 106 has integral wear resistant faces.

Although embodiments of the present invention have been described in the context of downhole drilling motors, one of ordinary skill in the art would appreciate that the thrust bearing assemblies of the present invention are equally applicable to other applications for thrust bearings, such as in rock crushing equipment. Therefore, notwithstanding the particular benefits associated with applying the present invention to drilling motors, the present invention should be considered broadly applicable to any application in need of thrust bearings.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A thrust bearing assembly comprising:
   a rotating bearing runner having a wear resistant face;
   a stationary bearing carrier defining a plurality of cavities disposed annularly around the carrier;
   a deflection element disposed in a cavity of the plurality of cavities; and
   a pad disposed over the deflection element, the pad at least partially disposed within the cavity, and the wear resistant face of the rotating bearing runner contacting the pad.

2. The thrust bearing assembly of claim 1, further comprising a load distribution washer disposed between the deflection element and the pad.

3. The thrust bearing assembly of claim 2, the load distribution washer comprising a steel disc.

4. The thrust bearing assembly of claim 1, the pad and the cavity being generally circular, and the pad comprising a ceramic disc.

5. The thrust bearing assembly of claim 1, the deflection element comprising a Belleville washer.

6. The thrust bearing assembly of claim 1, the cavity having a longitudinal axis, the cavity constraining the pad in a radial direction while allowing the pad to move in a direction generally along the longitudinal axis.

7. The thrust bearing assembly of claim 1, the wear resistant face of the rotating bearing runner comprising a wear resistant insert.

8. The thrust bearing assembly of claim 1, the deflection element being partially compressed before operation of the thrust bearing assembly.

9. The thrust bearing assembly of claim 1, the deflection element and the pad being unconnected.

10. A thrust bearing assembly for a downhole motor comprising:
- a first stationary bearing carrier defining a first plurality of cavities disposed annularly around the first stationary bearing carrier;
- a second stationary bearing carrier defining a second plurality of cavities disposed annularly around the second stationary bearing carrier; and
- a rotating bearing runner disposed between the first stationary bearing carrier and the second stationary bearing carrier, the rotating bearing carrier having a first wear resistant face and a second wear resistant face,
- each cavity of the first plurality of cavities and the second plurality of cavities holding a deflection element and a pad disposed over the deflection element,
- the first wear resistant face in contact with the pads of the first stationary bearing carrier, and
- the second wear resistant face in contact with the pads of the second stationary bearing carrier.

11. The thrust bearing assembly of claim 10, further comprising a load distribution washer disposed between the deflection element and the pad of the each cavity.

12. The thrust bearing assembly of claim 11, the load distribution washer comprising a steel disc.

13. The thrust bearing assembly of claim 10, the first wear resistant face and the second wear resistant face comprising abrasion resistant rings.

14. The thrust bearing assembly of claim 10, the first stationary bearing carrier being fixed to the second stationary bearing carrier by one of bolting and welding.

15. The thrust bearing assembly of claim 10, the pad comprising a ceramic disc.

16. The thrust bearing assembly of claim 10, the deflection element comprising a Belleville washer.

17. The thrust bearing assembly of claim 10, the first stationary bearing carrier further defining a third plurality of cavities facing in a direction opposite to the first plurality of cavities, each cavity of the third plurality of cavities holding a deflection element and a pad disposed over the deflection element, and the thrust bearing assembly further comprising:
- a second rotating bearing runner having a first wear resistant face and a second wear resistant face, the first wear resistant face of the second rotating bearing runner in contact with the pads of the third plurality of cavities; and
- a stationary bearing member defining a fourth plurality of cavities, each cavity of the fourth plurality of cavities holding a deflection element and a pad disposed over the deflection element, the pads of the fourth plurality of cavities in contact with the second wear resistant face of the second bearing runner.

18. The thrust bearing assembly of claim 17, the stationary bearing member adapted to be compressed by a drill casing.

19. The thrust bearing assembly of claim 17, further comprising a blank runner coupled to the second stationary bearing carrier, the blank runner configured to engage a blank overload stop prior to bottoming of the deflection elements.

20. The thrust bearing assembly of claim 10, each cavity of the first and second pluralities of cavities having a longitudinal axis, the each cavity constraining the pad in a radial direction while allowing the pad to move in a direction generally along the longitudinal axis.

21. The thrust bearing assembly of claim 10, each cavity of the first and second pluralities of cavities comprising a counterbored circular hole.

22. A downhole drilling apparatus that includes a progressive cavity drive train comprising:
- a housing structure;
- a stator, the stator having a longitudinal axis;
- a rotor having a true center, the rotor being located within the stator;
- the stator and the rotor each having coacting helical lobes that are in contact with one another at any transverse section, the stator having one more helical lobe than the rotor such that a plurality of progressive cavities is defined between the rotor and the stator, and the rotor being adapted to rotate within the stator such that the true center of the rotor orbits the axis of the stator, the orbit having a predetermined radius and the orbiting motion of the rotor causing a progression of the progressive cavities in the direction of the axis of the stator;
- a thrust bearing assembly coupled to the rotor, the thrust bearing assembly comprising
  - a rotating bearing runner having a wear resistant face;
  - a stationary bearing carrier defining a plurality of cavities disposed annularly around the carrier;
  - a deflection element disposed in a cavity of the plurality of cavities; and
  - a pad disposed over the deflection element, the pad at least partially disposed within the cavity, and the wear resistant face of the rotating bearing runner contacting the pad.

23. The downhole drilling apparatus of claim 22, the cavity having a longitudinal axis, the cavity constraining the pad in a radial direction while allowing the pad to move in a direction generally along the longitudinal axis.

* * * * *